(12) United States Patent
Zhou et al.

(10) Patent No.: US 10,959,371 B2
(45) Date of Patent: Mar. 30, 2021

(54) AUTOMATIC WORKING SYSTEM, SELF-MOVING DEVICE AND CONTROL METHOD THEREOF

(71) Applicant: Positec Power Tools (Suzhou) Co., Ltd., Jiangsu (CN)

(72) Inventors: Chang Zhou, Suzhou (CN); Yiyun Tan, Suzhou (CN); Ka Tat Kelvin Wong, Suzhou (CN); Qiang Liu, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/054,218

(22) Filed: Aug. 3, 2018

(65) Prior Publication Data

US 2018/0359916 A1    Dec. 20, 2018

Related U.S. Application Data

(63) Continuation of application No. PCT/CN2017/072982, filed on Feb. 6, 2017.

(30) Foreign Application Priority Data

Feb. 6, 2016  (CN) .......................... 201610081509.2

(51) Int. Cl.
*A01D 34/00* (2006.01)
*G01S 19/47* (2010.01)
(Continued)

(52) U.S. Cl.
CPC ......... *A01D 34/008* (2013.01); *G01C 21/165* (2013.01); *G01S 19/47* (2013.01);
(Continued)

(58) Field of Classification Search
None
See application file for complete search history.

(56) References Cited

U.S. PATENT DOCUMENTS 4,524,357 A * 6/1985 Nakamura ............. G01C 25/00
33/356
9,842,254 B1 * 12/2017 Brailovskiy ......... H04N 5/2258
(Continued)

FOREIGN PATENT DOCUMENTS

CN   101403620   4/2009
CN   101950027   1/2011
(Continued)

OTHER PUBLICATIONS

English Translation of WO2015147111 (Year: 2018).*
(Continued)

*Primary Examiner* — Nicholas K Wiltey
(74) *Attorney, Agent, or Firm* — Middleton Reutlinger

(57) ABSTRACT

The present invention relates to a self-moving device moving and working in a work area defined by a border, includes: a housing; a moving module, mounted in the housing, and driven by a drive motor to drive the self-moving device to move; a control module, controlling the self-moving device to move and work; a satellite navigation device, receiving a satellite signal; at least one position sensor, detecting a feature related to a position of the self-moving device; and a fusion processing unit comprising at least two inputs, one is the satellite signal, and the other is an output of the position sensor; the fusion processing unit performs operation on the satellite signal and the output of the position sensor, and outputs position information of the self-moving device; and the control module controls the moving module to drive the self-moving device to move based on the position information.

13 Claims, 4 Drawing Sheets

(51) Int. Cl.
  *G05D 1/02* (2020.01)
  *G01C 21/16* (2006.01)
  *G01S 19/49* (2010.01)
  *A01D 101/00* (2006.01)

(52) U.S. Cl.
  CPC .............. *G01S 19/49* (2013.01); *G05D 1/027* (2013.01); *G05D 1/0272* (2013.01); *G05D 1/0278* (2013.01); *A01D 2101/00* (2013.01); *G05D 2201/0208* (2013.01)

(56) References Cited

U.S. PATENT DOCUMENTS

| | | | |
|---|---|---|---|
| 2004/0186644 A1* | 9/2004 | McClure | A01B 69/008 |
| | | | 701/50 |
| 2006/0071851 A1* | 4/2006 | Graas | G01S 19/37 |
| | | | 342/357.395 |
| 2008/0039991 A1 | 2/2008 | May et al. | |
| 2008/0119970 A1* | 5/2008 | Campbell | G05D 1/0676 |
| | | | 701/8 |
| 2009/0099730 A1* | 4/2009 | McClure | G05D 1/027 |
| | | | 701/41 |
| 2010/0007554 A1* | 1/2010 | Wang | G01S 19/02 |
| | | | 342/357.29 |
| 2013/0218397 A1 | 8/2013 | Griffini et al. | |
| 2014/0058611 A1* | 2/2014 | Borinato | G05D 1/0265 |
| | | | 701/23 |
| 2014/0166047 A1 | 6/2014 | Hillen et al. | |
| 2015/0073697 A1* | 3/2015 | Barrett | G01S 19/426 |
| | | | 701/409 |
| 2016/0129593 A1* | 5/2016 | Wolowelsky | B25J 9/1666 |
| | | | 700/253 |
| 2016/0146616 A1* | 5/2016 | Ren | G01C 21/30 |
| | | | 701/409 |
| 2016/0278285 A1 | 9/2016 | Reigo | |
| 2016/0297070 A1 | 10/2016 | Reigo et al. | |
| 2016/0334795 A1 | 11/2016 | Reigo et al. | |
| 2016/0350927 A1* | 12/2016 | Ma | G06T 5/002 |
| 2018/0010914 A1* | 1/2018 | Hardt | B64C 19/00 |
| 2018/0025632 A1* | 1/2018 | Breed | G01C 21/32 |
| | | | 701/93 |
| 2018/0081426 A1* | 3/2018 | Rothkopf | G02B 27/0179 |

FOREIGN PATENT DOCUMENTS

| | | |
|---|---|---|
| CN | 103853154 | 6/2014 |
| CN | 105980948 | 9/2016 |
| CN | 106164799 | 11/2016 |
| DE | 102013113426 | 6/2014 |
| EP | 2741483 | 6/2014 |
| EP | 3104245 | 12/2016 |
| EP | 3125058 | 2/2017 |
| JP | 2011065308 | 3/2011 |
| KR | 2016118331 | 10/2016 |
| KR | 2016139019 | 12/2016 |
| SE | 201451645 | 5/2016 |
| WO | 2015072896 | 5/2015 |
| WO | 2015072897 | 5/2015 |
| WO | 2015094053 | 6/2015 |
| WO | 2015119263 | 8/2015 |
| WO | 2015147111 | 10/2015 |
| WO | 2016097891 | 6/2016 |
| WO | 2016098050 | 6/2016 |
| WO | 2016102143 | 6/2016 |

OTHER PUBLICATIONS

Georg zur Bonsen, Daniel Ammann, Michael Ammann, Etienne Favey, and Pascal Flammant, titled, "Combining GPS with Sensor-Based Dead Reckoning", GPS World, Apr. 1, 2005 (Year: 2005).*
European Patent Office, Supplemental European Search Report for EP17747027 dated Sep. 4, 2019, 2 pages.

* cited by examiner

AUTOMATIC WORKING SYSTEM, SELF-MOVING DEVICE AND CONTROL METHOD THEREOF

BACKGROUND

Technical Field

The present invention relates to an automatic working system, and further relates to a self-moving device and a control method thereof.

With the continuous advancement of the computer technology and artificial intelligence technology, the automatic working systems similar to intelligent robots have begun to slowly enter people's lives. A good example is the application of an autonomous mower system, and the autonomous mower system can finish the cutting of a lawn without manual operation. The autonomous mower system is usually small in size and is integrated with a cutting system, a drive system, an energy system, and a control system. Once the autonomous mower system is set up, there is no need to invest in energy for management, and the user is liberated from the tedious work of maintaining the lawn, so the autonomous mower system is very popular.

SUMMARY

The automatic working system such as the autonomous mower system requires precise cooperation of multiple systems and multiple technologies for normal working, and location is one of the key technologies. The location technology helps a self-moving device of the automatic working system to reduce the time of repetitive walking and to fully cover a work area. For example, the self-moving device such as the autonomous mower that works outdoor may located by a Global Navigation Satellite System (GNSS), and if there is sufficient satellite coverage, the GNSS can provide precise position information. However, the satellite signal is sometimes blocked by buildings, trees, etc. If the self-moving device cannot receive the reliable satellite signal, the self-moving device cannot be accurately navigated within the work area, and cannot cover the entire area well.

In order to achieve more precise and uninterrupted location information, a relative location system without the need to rely on an external information source, such as an inertial navigation system (INS), including an inertial sensor, can be utilized, and the initial estimation of the position, speed and orientation angle of the self-moving device is used as a start point, and is integrated with the time to determine the current position, speed, and orientation angle of the self-moving device. However, the inertial sensor only is not suitable for precise location because the required data integration operation will cause a location solution to be deviated with the time, resulting in an infinite amount of error accumulation.

An aspect of the disclosure provides a self-moving device, moving and working in a work area defined by a border, and having a housing; a moving module, mounted in the housing, and driven by a drive motor to drive the self-moving device to move; a control module, controlling the self-moving device to move and work; a satellite navigation device, receiving a satellite signal; at least one position sensor, detecting a feature related to a position of the self-moving device; wherein the self-moving device further comprises a fusion processing unit, the fusion processing unit comprises at least two inputs, one of which is the satellite signal, and the other of which is an output of the position sensor; the fusion processing unit performs operation on the satellite signal and the output of the position sensor, and outputs position information of the self-moving device; and the control module controls the moving module to drive the self-moving device to move based on the position information of the self-moving device output by the fusion processing unit.

In an embodiment, the position sensor comprises a motion or state sensor, which detects the motion parameters or state parameters of the self-moving device.

In an embodiment, the motion or state sensor comprises an inertial navigation sensor.

In an embodiment, the inertial navigation sensor comprises at least one of an accelerator, an odometer, a gyroscope and an attitude detection sensor.

In an embodiment, the control module judges an output error of the inertial navigation sensor, and when the error is larger than or equal to a preset value, the satellite signal is used to correct the output error of the inertial navigation sensor.

In an embodiment, the self-moving device comprises at least two position sensors, at least one of which is independent from the inertial navigation sensor; and the control module judges an output error of the inertial navigation sensor, and when the error is larger than or equal to a preset value, the output of the position sensor independent from the inertial navigation sensor is used to correct the output error of the inertial navigation sensor.

In an embodiment, the control module judges an output error of the inertial navigation sensor, and when the error is larger than or equal to a preset value, the moving module is controlled to drive the self-moving device to change a moving manner to correct the output error of the inertial navigation sensor.

In an embodiment, the control module controls the moving module to drive the self-moving device to change a moving manner comprises controlling the self-moving device to stop moving.

In an embodiment, the moving module comprises a wheel set, and the motion or state sensor comprises a wheel speed meter, which detects a rotary speed of the wheel set.

In an embodiment, the position sensor comprises an environmental detection sensor, which detects a position relationship of the self-moving device relative to the border.

In an embodiment, the environmental detection sensor comprises a surface recognition sensor, which detects whether the lower side or the front side in a moving direction of the self-moving device is a surface to be processed.

In an embodiment, the surface sensor comprises at least one of a capacitance sensor, a camera and an infrared sensor.

In an embodiment, the environmental detection sensor comprises an obstacle detection sensor, which detects whether an obstacle exists in the moving direction of the self-moving device.

In an embodiment, the obstacle detection sensor comprises at least one of an ultrasonic sensor and a laser sensor.

In an embodiment, the satellite navigation device is a DGPS device.

In an embodiment, when the fusion processing unit performs operation on the position information of the self-moving device, the weight of the satellite signal and the weight of output from the position sensor are adjusted according to whether the satellite signal received by the satellite navigation device is reliable or not.

In an embodiment, when the satellite signal received by the satellite navigation device is reliable, the weight of the output from the position sensor is zero.

An aspect of the disclosure provides a control method for a self-moving device, having the following steps: receiving a satellite signal; detecting a feature related to a position of the self-moving device, and output a feature parameter; performing fusion processing on the satellite signal and the feature parameter, and outputting position information of the self-moving device; and controlling the self-moving device to move based on the position information of the self-moving device.

In an embodiment, an inertial navigation sensor is provided to detect the feature related to the position of the self-moving device.

Compared with the prior art, the present disclosure has the beneficial effects that the self-moving device can continuously acquire precise navigation data by fusing the satellite navigation signal with the inertial navigation signal, or fusing the satellite navigation signal with other parameters that can reflect the current position of the self-moving device, thereby ensuring the safety of the automatic working system and improving the working efficiency of the automatic working system.

An aspect of the disclosure provides an automatic working system, comprising a self-moving device, wherein the self-moving device comprises a satellite navigation device, which comprises at least one satellite signal receiver, and outputs a first position signal indicating the position of the self-moving device; and an inertial navigation device which comprises at least one sensor detecting the motion or state parameters of the self-moving device and outputs a second position signal indicating the position of the self-moving device; the automatic working system further comprises a control module, controlling the self-moving device to work based on the first position signal when judging that the first position signal output by the satellite navigation device is reliable, and controlling the self-moving device to work based on a third position signal when judging that the first position signal output by the satellite navigation device is unreliable, wherein the third position signal is acquired by integrating the signals of the satellite navigation device and the inertial navigation device.

In an embodiment, when the control module judges that the satellite navigation device does not receive the satellite signal, the control module controls the self-moving device to work based on the second position signal output by the inertial navigation device.

In an embodiment, the control module controls the self-moving device to work in a first mode based on the first position signal or the third position signal, and controls the self-moving device to work in a second mode based on the second position signal.

In an embodiment, in the first mode, the self-moving device continues to walk.

In an embodiment, in the second mode, the self-moving device intermittently walks, and when the self-moving device stops walking, the control module corrects the error of the second position signal by using an actual motion parameter value of the self-moving device.

In an embodiment, the actual motion parameter value of the self-moving device comprises a speed parameter having a value of zero.

In an embodiment, in the second mode, the self-moving device stops walking for time T2 every time walking for time T1, and the error of the second position signal is corrected during the time T2 by using the actual motion parameter value of the self-moving device.

In an embodiment, the self-moving device further comprises at least one sensor which is independent of the inertial navigation device and detects the motion or state parameters of the self-moving device for correcting the error of the second position signal.

In an embodiment, the self-moving device further comprises a wheel set, and the sensor independent of the inertial navigation device is a wheel speed sensor.

In an embodiment, when the satellite signal receiver receives the signals of four or more than four satellites, it is judged that the first position signal output by the satellite navigation device is reliable; when the satellite signal receiver receives the signals of one to three satellites, it is judged that the first position signal output by the satellite navigation device is unreliable; and when the satellite signal receiver receives the signal of 0 satellite, it is judged that the satellite navigation device cannot receive the satellite signal.

In an embodiment, the first position signal is a differential GPS signal.

An aspect of the disclosure provides a method for continuously and precisely determining the position of a self-moving device, which comprises the following steps of:

S1: receiving the satellite signal by using at least one satellite signal receiver, and calculating at least one motion or state parameter of the self-moving device by using an inertial navigation device;

S2: judging whether the satellite signal is reliable;

S3: outputting a first position signal generated based on the satellite signal if the satellite signal is reliable; and S4: outputting a third position signal generated based on the fusion of the satellite signal and a signal of the inertial navigation device if the satellite signal is unreliable.

In an embodiment, the method further comprises the step S5: outputting a second position signal generated based on the parameters of an inertial navigation unit if the satellite signal disappears.

In an embodiment, the step S5 comprises the following operation: controlling the self-moving device to stop walking, and correcting an error of the signal of the inertial navigation device by using an actual motion parameter value of the self-moving device.

In an embodiment, the self-moving device is controlled to stop walking for time T2 every time walking for time T1, and the error of the signal of the inertial navigation device is corrected during the time T2 by using the actual motion parameter value of the self-moving device.

In an embodiment, the method further comprises the step S6: returning to step S3 or step S4 if the satellite signal is recovered.

In an embodiment, the step S5 comprises the following operation: correcting the error of the signal of the inertial navigation device by using at least one sensor which is independent of the inertial navigation device and detects the motion or state parameters of the self-moving device.

An aspect of the disclosure provides an automatic working system, comprising a self-moving device and a base station, wherein the self-moving device comprises a navigation module, the navigation module comprises a first signal receiving device, a second signal receiving device, an inertial navigation device, and a fusion processing unit; the base station is configured to receive and process a satellite signal, and send the processed signal to the first signal receiving device by a wireless communication device; the second signal receiving device receives the satellite signal; the fusion processing unit integrates the signals received by the first signal receiving device and the second signal receiving device with the signal of the inertial navigation device to generate a third position signal indicating the position of the self-moving device.

Another aspect of the disclosure provides a system for determining the position of a self-moving device, wherein the system comprises: a satellite navigation device comprising at least one satellite signal receiver that generates a first position signal indicating the position of the self-moving device; an inertial navigation device comprising at least one sensor detecting the motion or state parameters of the self-moving device, and generating a second position signal indicating the position of the self-moving device; and a fusion processing unit, integrating the parameters from the satellite navigation device and the inertial navigation device to generate a third position signal indicating the position of the self-moving device. The system for determining the position of a self-moving device further comprises: a control module, detecting whether the first position signal output by the satellite navigation device is reliable, outputting the first position signal as a position signal of the self-moving device when detecting that the first position signal is reliable, and outputting the third position signal as a position signal of the self-moving device when detecting that the first position signal is unreliable.

In an embodiment, when the control module detects that the satellite signal disappears, the second position signal is output as a position signal of the self-moving device.

In an embodiment, when the control module detects that the satellite signal disappears, the self-moving device is controlled to stop walking, the error of the signal of the inertial navigation device is corrected by using an actual motion parameter value of the self-moving device, and then the self-moving device is controlled to continue to walk.

In an embodiment, when the control module detects that the satellite signal disappears, the self-moving device is controlled to stop walking for time T2 every time walking for time T1, and the error of the signal of the inertial navigation device is corrected during the time T2 by using the actual motion parameter value of the self-moving device.

In an embodiment, when the control module detects the satellite signal is recovered, the self-moving device is controlled to continue to walk. When it is detected that the first position signal is reliable, the first position signal is output as the position signal of the self-moving device, and when it is detected that the first position signal is unreliable, the third position signal is output as a position signal of the self-moving device.

Another aspect of the disclosure provides an automatic working system comprising a self-moving device, wherein the self-moving device comprises: a satellite navigation device comprising at least one satellite signal receiver; an inertial navigation device comprising at least one sensor detecting the motion or state parameters of the self-moving device; and a fusion processing unit integrating the parameters from the satellite navigation device and the inertial navigation device when the satellite signal receiver receives the satellite signal, to generate a signal indicating the position of the self-moving device. When the satellite signal receiver does not receive the satellite signal, the position signal generated by the inertial navigation device is output, the self-moving device is caused to intermittently walk, and the error of the position signal output by the inertial navigation device is corrected by using an actual motion parameter value of the self-moving device when the self-moving device stops walking.

Another aspect of the disclosure provides an automatic working system comprising a self-moving device, wherein the self-moving device comprises: a satellite navigation device comprising at least one satellite signal receiver; an inertial navigation device comprising at least one sensor detecting the motion or state parameters of the self-moving device; at least one sensor independent of the inertial navigation device and detecting the motion or state parameters of the self-moving device; and a fusion processing unit integrating the parameters from the satellite navigation device and the inertial navigation device when the satellite signal receiver receives the satellite signal, to generate a signal indicating the position of the self-moving device. When the satellite signal receiver does not receive the satellite signal, a position signal generated by the inertial navigation device is output, and the error of the signal of the inertial navigation device is corrected by using the signal output from the sensor independent of the inertial navigation device.

In an embodiment, the self-moving device comprises a wheel set, and the sensor independent of the inertial navigation device is a wheel speed sensor.

Another aspect of the disclosure provides an automatic working system comprising a self-moving device, wherein the self-moving device comprises a satellite navigation device comprising at least one satellite signal receiver; and an inertial navigation device outputting a signal indicating the position of the self-moving device; the self-moving device further comprises a control module, the control module detects whether the satellite signal received by the satellite signal receiver is reliable, and if the satellite signal is reliable, the satellite signal is used to correct the position signal output by the inertial navigation device; if the satellite signal is unreliable or the satellite signal cannot be received, the self-moving device is caused to intermittently walk, and when the self-moving device stops walking, the error of the position signal output by the inertial navigation device is corrected by using an actual motion parameter value of the self-moving device.

Another aspect of the disclosure provides an automatic working system comprising a self-moving device, wherein the self-moving device comprises: a satellite navigation device comprising at least one satellite signal receiver; an inertial navigation device outputting a signal indicating the position of the self-moving device; and at least one sensor independent of the inertial navigation device and detecting the motion or state parameters of the self-moving device. The self-moving device further comprises a control module, the control module detects whether the satellite signal received by the satellite signal receiver is reliable, if the satellite signal is reliable, the satellite signal is used for correcting the position signal output by the inertial navigation device; and if the satellite signal is unreliable or the satellite signal cannot be received, the signal output from the sensor independent of the inertial navigation device is used to correct the error of the signal of the inertial navigation device.

In an embodiment, the self-moving device comprises a wheel set, and the sensor independent of the inertial navigation device is a wheel speed sensor.

Another aspect of the disclosure provides an automatic working system comprising a self-moving device, wherein the self-moving device comprises: at least one satellite signal receiver; and an inertial navigation device generating a signal indicating the position of the self-moving device. The position signal generated by the inertial navigation device is used as a navigation signal of the self-moving device and the satellite signal received by the satellite signal receiver is used to correct the error of the signal of the inertial navigation device.

Another aspect of the disclosure provides an automatic working system comprising a self-moving device, wherein the self-moving device comprises: an inertial navigation device generating a signal indicating the position of the self-moving device; and at least one sensor independent of the inertial navigation device and detecting the motion or state parameters of the self-moving device. The position signal generated by the inertial navigation device is used as a navigation signal of the self-moving device, and the error of the signal of the inertial navigation device is corrected by using the signal output from the sensor independent of the inertial navigation device.

BRIEF DESCRIPTION OF THE DRAWINGS

The objectives, technical solutions, and beneficial effects of embodiments in the present invention described above can be achieved by the following accompanying drawings.

DETAILED DESCRIPTION

Figure 1:
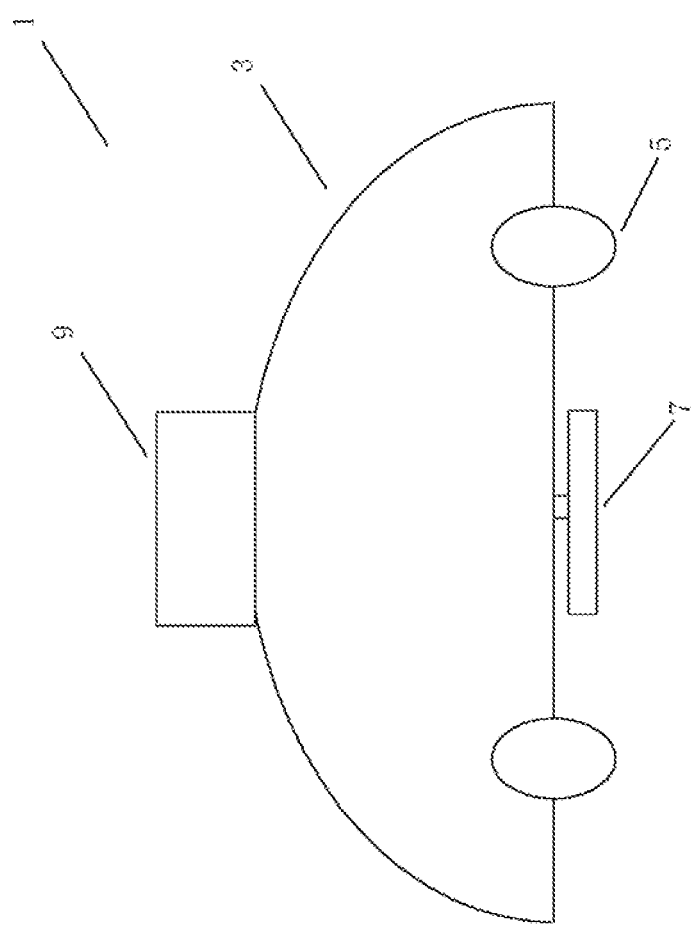
FIG. 1 is a structural schematic diagram of an autonomous mower according to an example embodiment of the present invention.

FIG. 1 is a structural schematic diagram of a self-moving device according to an example embodiment of the present invention. In the present embodiment, the self-moving device is an autonomous mower 1. In other embodiments, the self-moving device may also be an unattended device such as an autonomous snow sweeper or an autonomous water sprinkler. In the present embodiment, the autonomous mower 1 comprises a housing 3, a moving module 5, a cutting module 7, an energy module (not shown), a control module (not shown), and the like. The moving module 5, the cutting module 7, the energy module, and the control module are all mounted in the housing 3. The moving module 5 comprises a wheel set driven by a drive motor to drive the autonomous mower 1 to move. The cutting module 7 comprises a cutting component mounted on the bottom of the housing and driven by a cutting motor to rotate to execute mowing work. The energy module comprises a battery pack supplying power to the movement and work of the autonomous mower 1. The control module is electrically connected to the moving module 5, the cutting module 7, and the energy module, controls the moving module 5 to drive the autonomous mower 1 to move, and controls the cutting module 7 to execute the mowing task.

In an example embodiment, the autonomous mower 1 comprises a navigation module 9 electrically connected to the control module, to provide current position information for the autonomous mower 1, so that the autonomous mower 1 can move and work within the work area defined by a border. The border comprises the border of the work area, such as the border between grass and non-grass, and obstacles within the work area.

Figure 2:
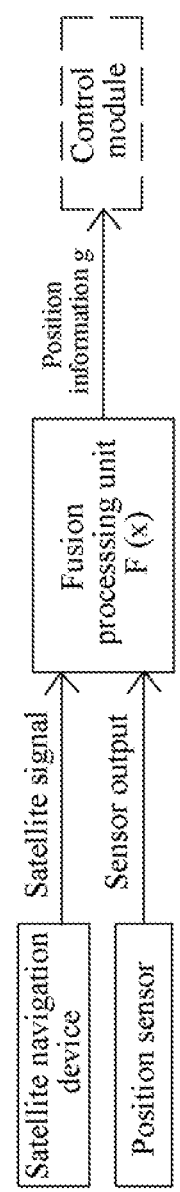
FIG. 2 is a schematic diagram of a navigation module of the autonomous mower according to an example embodiment of the present invention.

FIG. 2 is a principle diagram of the navigation module according to an example embodiment. In the present embodiment, the navigation module comprises a satellite navigation device receiving a satellite signal, and the satellite signal comprises a satellite angle, a clock, and the like.

In the present embodiment, the satellite signal is a GPS signal. In other embodiments, the satellite signal may also be a Galileo signal, a Beidou signal, etc., or several signals are used simultaneously. Specifically, in the present embodiment, the satellite signal is a differential GPS (DGPS) signal.

The navigation module also comprises at least one position sensor detecting the features related to the position of the autonomous mower. In the present embodiment, the position sensor comprises a motion or state sensor which detects motion or state parameters of the self-moving device. Specifically, in the present embodiment, the motion or state sensor comprises an inertial navigation sensor. The inertial navigation sensor may comprise an accelerometer, an odometer, a gyroscope, an attitude detection sensor, etc., which detect the speed, acceleration, driving direction and the like of the self-moving device.

The navigation module further comprises a fusion processing unit, the fusion processing unit comprises at least two inputs, one of which is a satellite signal, and the other of which is an output of the inertial navigation sensor. The fusion processing unit operates on the satellite signal and the output of the inertial navigation sensor to output position information of the autonomous mower. In the present embodiment, the satellite navigation device directly inputs the received satellite signal to the fusion processing unit. The fusion processing unit uses a complex algorithm F(x) to obtain the position coordinate g of the self-moving device rather than respectively outputting the position coordinates and then performing simple processing by the satellite navigation device and the inertial navigation sensor. In the present embodiment, the fusion processing unit always has two inputs, that is, the satellite signal and the output of the inertial navigation sensor. Even when the satellite signal is blocked, the operation of the fusion processing unit still needs to read the satellite signal and a certain weight is given. That is to say, even when the satellite signal is poor, the satellite signal still participates in the operation of the fusion processing unit. In the present embodiment, during the working process of the autonomous mower, the control module always controls the moving module to drive the autonomous mower to move based on the position information of the autonomous mower output by the fusion processing unit.

The autonomous mower according to the present embodiment processes the satellite signal and the output of the inertial navigation sensor by the fusion processing unit to obtain precise navigation data, and the autonomous mower can be continuously located at a high precision even when the satellite signal is blocked. Therefore, the safety and the high efficiency of the work of the autonomous mower are guaranteed.

In an example embodiment, the output of the inertial navigation sensor accumulates the error with the time, as a result, the precision of the output of the inertial navigation sensor is reduced. Therefore, it is necessary to correct the output error of the inertial navigation sensor. In the present embodiment, the control module judges the output error of the inertial navigation sensor, and when the error is greater than a preset value, the output error of the inertial navigation sensor is corrected. The judgment on the output error of the inertial navigation sensor can be judged by comparing the position of the autonomous mower indicated by the relatively reliable satellite signal with the position of the autonomous mower indicated by the output of the inertial navigation sensor, or by detecting the distance of the autonomous mower deviated from a preset route, or by calculating the duration from the time when the inertial navigation sensor was corrected last time, and so on.

The correction on the output error of the inertial navigation sensor comprises various modes, one of which is to correct the output error of the inertial navigation sensor by using the satellite signal, for example, the satellite signal is used to correct the output error of the inertial navigation sensor every preset time, or when it is judged that the satellite signal is reliable, the satellite signal is used to correct the output error of the inertial navigation sensor.

Another mode to correct the output error of the inertial navigation sensor is that at least two position sensors are disposed, at least one of which is independent of the inertial navigation sensor, for example, an independent wheel speed meter, etc., and the output parameter of the position sensor independent of the inertial navigation sensor is used to correct the output error of the inertial navigation sensor.

Another mode to correct the output error of the inertial navigation sensor is to control the moving module to drive the self-moving device to change a moving mode. Specifically, the autonomous mower is controlled to stop moving. When the autonomous mower stops moving, the speed and acceleration parameters are zero, and the output error of the inertial navigation sensor is corrected by the motion or state parameters when the autonomous mower stops moving.

In an example embodiment of the present invention, the motion and state sensor comprises a wheel speed meter which detects a rotary speed of the wheel set. The wheel speed meter may be a code disc. Of course, the navigation module can also comprise other motion or state sensors to detect the motion or state parameters of the autonomous mower. The independent motion or state sensor is more flexible in setting compared with the integrated inertial navigation sensor. Of course, in other embodiments, the motion or state sensor such as the wheel speed meter may also be called by a joint name inertial navigation sensor.

In an example embodiment of the present invention, the position sensor comprises an environmental detection sensor which detects a position relationship of the self-moving device relative to the border. The environmental detection sensor may comprise a grassland recognition sensor which detects whether the lower side or the front side of the motion direction of the autonomous mower is the grass to be cut. The grass recognition sensor may comprise a capacitive sensor, a camera, an infrared sensor, and the like. The environmental detection sensor may further comprise an obstacle detection sensor which detects whether there is an obstacle in the moving direction of the autonomous mower. The obstacle detection sensor may comprise an ultrasonic sensor, a laser sensor, or the like. The ultrasonic sensor or laser sensor emits a signal to the environment and receives a signal reflected by the obstacle to judge the distance between the obstacle and the autonomous mower, so as to realize non-contact detection. The environmental detection sensor outputs a parameter of the position relationship of the autonomous mower relative to the border. When the fusion processing unit processes the satellite signal and the output of the environmental detection sensor, the location error of the satellite signal is evaluated. If the position relationship of the autonomous mower relative to the border is uncertain within the location error range of the satellite signal, then when the output of the environmental detection sensor indicates that the autonomous mower is within the border, the position information output by the fusion processing unit responds that the autonomous mower is within the border, and the control module controls the autonomous mower to continue to advance. The environmental detection sensor can assist in the navigation of the autonomous mower, thereby ensuring the work safety of the autonomous mower.

In an example embodiment of the present invention, when the fusion processing unit calculates the position information of the autonomous mower, according to the fact whether the satellite signal received by the satellite navigation device is reliable, the weight of the satellite signal and the output of the inertial navigation sensor is adjusted. When the satellite signal is reliable, for example, when the satellite navigation device can receive the signals of four or more than four satellites, the weight of the satellite signal is increased, and the weight of the output of the inertial navigation sensor is reduced. When the satellite signal is unreliable, for example, when the satellite navigation device receives the signals of less than 4 satellites, the weight of the satellite signal is reduced, and the weight of the output of the inertial navigation sensor is increased. In the present embodiment, when the satellite signal received by the satellite navigation device is reliable, the weight of the output of the inertial navigation sensor is caused to be zero. That is to say, when the satellite signal is reliable, the fusion processing unit outputs the position information of the autonomous mower only based on the satellite signal received by the satellite navigation device.

Of course, in other embodiments, by adjusting the weight of the satellite signal and the output of the inertial navigation sensor, the weight of the satellite signal can always be caused to be zero, that is to say, the fusion processing unit outputs the position information of the autonomous mower only based on the output of the inertial navigation sensor. The satellite signal is used to correct the output error of the inertial navigation sensor.

In an example embodiment of the invention, the autonomous mower comprises a satellite navigation device, and the satellite navigation device comprises at least one satellite signal receiver outputting a first position signal indicating the position of the autonomous mower. In the present embodiment, the satellite signal receiver is a Global Positioning System (GPS) receiver receiving the signals from a GNSS. Of course, the satellite signal receiver may also be the receiver receiving the signals from a Galileo satellite navigation system or a Beidou satellite navigation system. The GPS receiver can communicate with a satellite cluster, and receive the signals indicating an actual position of each GPS receiver from the satellites. The satellite navigation device processes the received satellite signal to generate a signal indicating the current position of the autonomous mower, i.e., the first position signal, and the processing procedure is the process of correcting the coordinates of the autonomous mower based on the differential GPS reference with known precise coordinates. The acquired first position signal is a differential GPS (D-GPS) signal. Specifically, the position signal is an (x, y, z) coordinate signal, and x, y, and z respectively indicate the current longitude, latitude, and altitude of the autonomous mower, an original point may also be set in the work area of the autonomous mower, and the output (x, y, z) is the position coordinate relative to the origin point.

The autonomous mower also comprises an inertial navigation device, and the inertial navigation device comprises at least one sensor which detects motion parameters of the autonomous mower and outputs a second position signal indicating the position of the autonomous mower. In the present embodiment, the autonomous mower comprises a plurality of inertial and motion sensors, and these sensors can form at least part of the inertial navigation device. The plurality of inertia and motion sensors may comprise an accelerometer, an odometer, a gyroscope and a compass, and may also comprise a wheel speed sensor, an advancing direction sensor, a steering angle sensor, an attitude or orientation sensor, and the like. The inertial navigation device estimates the position of the autonomous mower based on the parameter signals acquired by these sensors. During the position calculation, the previously determined position or location is adopted to calculate the current position, and the current position is calculated based on the known or estimated speed within the past time period and the particular process. The inertial navigation device can determine the current position of the autonomous mower from the last known good position or the known initial starting position of the autonomous mower by position calculation, and the position signal output by the inertial navigation device is the second position signal of the autonomous mower. The inertial navigation device can be provided as a separate system, and may comprise a computer or controller which continuously calculates the position, orientation, and speed of the autonomous mower without an external reference. One problem about using the inertial navigation devices is that the position signal output by the inertial navigation device continuously accumulates the error with the time and therefore precise location cannot be provided continuously.

The autonomous mower also comprises a fusion processing unit which integrates the signals of the satellite navigation device and the inertial navigation device, to output a third position signal indicating the position of the autonomous mower. The integration of the signals of the satellite navigation device and the inertial navigation device is realized by a Kalman filtering information fusion algorithm. The Kalman filtering is an efficient recursive filtering algorithm and estimates the state of a dynamic system based on a series of incomplete or possibly noisy signals. The signal output of the satellite navigation device is selectively output to the Kalman filtering together with the signal output of the inertial navigation device, and the position signal output by the Kalman filtering is the third position signal indicating the position of the autonomous mower. The advantage of using information fusion is that when the satellite signal is good, the position signal acquired by information fusion has high precision, which can be higher than the precision of the position signal output by the satellite navigation device. When the satellite signal is blocked, the position signal acquired by adopting information fusion can still be used for continuous navigation of the autonomous mower.

The autonomous mower may work based on different position signals. In an example embodiment of the present invention, when the satellite signal received by the satellite navigation device is good, that is, when the first position signal output by the satellite navigation device is reliable, the control module controls the autonomous mower to operate based on the first position signal. The first position signal is used as a navigation signal of the autonomous mower, to control the autonomous mower to walk in the work area. Specifically, the autonomous mower is controlled to be regularly driven according to the route preset by the user, whether the driving of the autonomous mower is deviated from the preset route is judged by detecting the real-time position of the autonomous mower, whether the entire work area is covered and whether the work is repeated in the covered area are judged by recording the driven position, and the driving direction is adjusted accordingly. When the satellite signal is blocked, the precision of the satellite signal is reduced, that is, the first position signal output by the satellite navigation device is unreliable, and the autonomous mower is controlled to work based on the third position signal, that is, work based on the position signal fused by the satellite signal and the inertial navigation signal. The working mode is the same as that during the work based on the first position signal. In an example embodiment, the high-precision inertial navigation device is used, and can output the high-precision signal for a long time. Therefore, when the satellite signal is unreliable, even when the satellite signal disappears, the third position signal is always used as the navigation signal of the autonomous mower.

In an example embodiment of the invention, when the satellite signal disappears, the autonomous mower is controlled to work based on the second position signal output by the inertial navigation device. The inertial navigation device continuously outputs the position signal during the work of the autonomous mower, and the error accumulation will be formed. Therefore, when the satellite signal disappears, the position signal acquired by the fusion algorithm is immediately used to reset the position signal output by the inertial navigation device. The error parameter estimated by the fusion algorithm is adopted to compensate inertial navigation, so that the position signal output by the inertial navigation device is caused to have high precision, the error parameter is accurate, and the inertial navigation device can be maintained to work for a long time.

In an example embodiment, the autonomous mower can work in different modes. When the satellite signal is good, the autonomous mower works in a first mode based on the first position signal, when the satellite signal is blocked, the autonomous mower works in the first mode based on the third position signal, and when the satellite signal disappears, the autonomous mower works in a second mode. In the first mode, the autonomous mower is driven regularly based on the route preset by the user, for example, driven in parallel routes in the work area, or driven in a spiral route with a gradually reduced radius from the border, and so on. In the second mode, the autonomous mower works based on the position signal output by the inertial navigation device. Since the error of the position signal output by the inertial navigation device is accumulated with the time, it is not suitable for the autonomous mower to continue to walk according to the preset route again. In the present embodiment, in the second mode, the autonomous mower intermittently walks, and when the autonomous mower stops walking, the error of the second position signal is corrected by using the actual motion parameter of the autonomous mower. The actual motion parameter of the autonomous mower comprises the speed parameter with a value of zero. The working mode of the autonomous mower in the second mode is as follows.

In an example embodiment, after the satellite signal disappears, the inertial navigation device can be used for precise location for a period of time, which is set to be T0. After the autonomous mower works for the time T0 based on the second position signal, the position signal output by the inertial navigation device cannot meet the accuracy requirement. At this point, the autonomous mower stops walking for a period of time T2, and then stops walking for the time T2 every time walking for the time T1. The walking route of the autonomous mower is the same as the walking route in the first mode. When the autonomous mower stops walking, the actual speed is zero, the speed output by the inertial navigation device is the speed error, and other various errors of the inertial navigation device are corrected based on the speed error, thereby acquiring the corrected position signal. By using the above method, precise location can be always provided for the autonomous mower when the satellite signal disappears. When the autonomous mower stops walking, the cutting module of the autonomous mower stops working in the meantime. The determination of T1 and T2 is related to a correction algorithm. For example, if the Kalman filtering is used for correction, a smaller T2 value and a larger T1 value can be acquired. In the present embodiment, T2 is between 10 seconds and 5 minutes, and T1 is between 1 minute and 10 minutes. Specifically, T2 is 1 minute and T1 is 2 minutes. The time of stopping the walking and the duration between the stopping moments of two adjacent times can also be controlled in real time by the control module. The above method for correcting the location error of the inertial navigation device can greatly improve the location accuracy of the inertial navigation device without a need to increase external devices, and is an effective and inexpensive technology.

An example embodiment of the present invention also provides a method for determining the position of an autonomous mower, comprising the following steps:

S1: receiving a satellite signal by using at least one satellite signal receiver, and calculating at least one motion or state parameter of the autonomous mower by using an inertial navigation device;

S2: judging whether the satellite signal is reliable;

S3: if the satellite signal is reliable, outputting a first position signal generated based on the satellite signal; and S4: if the satellite signal is unreliable, outputting a third position signal generated based on the fusion of the satellite signal and the parameter signal of the inertial navigation device.

In an example embodiment of the present invention, the satellite navigation device and the inertial navigation device may be selectively disposed at the top, or in any position of the front, rear, and side parts of the autonomous mower. At least one satellite signal receiver moves along with the movement of the autonomous mower, and the satellite signal receiver receives a signal indicating the actual position from the satellite, i.e., receives a signal indicating the actual position of the autonomous mower. The satellite navigation device processes the signal received by the satellite signal receiver to generate a first position signal indicating the position of the autonomous mower. When the autonomous mower is in an open environment, the satellite signal receiver can communicate with more satellites, and the received satellite signal is reliable. When the autonomous mower is blocked by houses, trees, etc., the satellite signal receiver can only communicate with less satellites, and the received satellite signal is unreliable. In the present embodiment, when the satellite signal receiver receives the signals of four or more than four satellites, it is judged that the satellite signal is reliable, that is, the first position signal is reliable, and when the satellite signal receiver receives the signals of one to three satellites, it is judged that the satellite signal is unreliable, i.e., the first position signal is unreliable. The number of required satellite signals is changed along with the satellite signal receiver and the operation and safety issues of the autonomous mower. If the satellite signal is reliable, the first position signal is used as the navigation signal of the autonomous mower. If the satellite signal is unreliable, another position signal is used as the navigation signal of the autonomous mower. The another position signal specifically refers to a third position signal generated based on the fusion of the satellite signal and the inertial navigation signal. In the present embodiment, at least one motion or state parameter of the autonomous mower is calculated by using the inertial navigation device. The inertial navigation device is disposed on the autonomous mower, and comprises at least one sensor detecting the motion parameters of the autonomous mower. The sensor may comprise a wheel speed sensor, a steering angle sensor, an accelerometer, an odometer, etc., and detects the motion parameters, including the speed, the acceleration, etc., as well as the state parameters, including the position parameter, etc., of the autonomous mower. The parameter signal of the inertial navigation device and the satellite signal are selectively fused together, and the fusion processing algorithm can adopt Kalman filtering or the like to obtain a new signal indicating the position of the autonomous mower, that is, the third position signal. The fused position signal can filter out the pure errors of the satellite signal and inertial navigation signal, and higher precision and stability are realized. In the present embodiment, when the satellite signal is unreliable, the fused third position signal is output as the navigation signal of the autonomous mower.

In an example embodiment of the present invention, the method for determining the position of the autonomous mower further comprises the step S5: outputting a second position signal generated based on the parameters of the inertial navigation device if the satellite signal disappears. When the autonomous mower walks to an area where satellite signal cannot be received, for example the area blocked by dense vegetation, the satellite signal is completely blocked, and the satellite signal disappears, at this point, the position signal output by the inertial navigation device is used for navigation. The inertial navigation device can estimate the current position of the autonomous mower according to the parameter signal acquired by the sensor based on the initial location value. The position signal generated by the inertial navigation device is the second position signal. The initial location value of the inertial navigation device is usually determined by the satellite signal when the inertial navigation device starts working. When the satellite signal is reliable, the location of the inertial navigation device can be continuously reset to eliminate the accumulated error of the inertial navigation device during the working process. In the present embodiment, it is not necessary to continuously reset the position signal of the inertial navigation device by using the satellite signal. In the present embodiment, when it is found that the satellite signal disappears, the position signal generated by processing the satellite signal and the inertial navigation signal with the fusion algorithm is used to reset the position signal of the inertial navigation device, so that the position signal of the inertial navigation device has high precision, and the time maintaining the accuracy requirement is long.

The step S5 may further comprise the following operation: controlling the autonomous mower to stop walking, and correcting the error of the parameter of the inertial navigation device by using the actual motion parameter of the autonomous mower. The position signal output by the inertial navigation device continuously accumulates the error along with the time. Therefore, the autonomous mower cannot maintain the accurate location after using the position signal output by the inertial navigation device as the navigation signal for a period of time. At this point, if the autonomous mower cannot recover the receiving of the satellite signal, a compensation measure is needed to correct the error of the inertial navigation signal. In the present embodiment, after the autonomous mower is enabled to enter the inertial navigation mode, that is, after the second position signal is used as the navigation signal, when the precision of the position signal is reduced till the work requirement cannot be met, the autonomous mower stops walking. The actual speed of the autonomous mower is zero, and the speed value output by the inertial navigation device is the speed error, and other various errors of the inertial navigation device are corrected based on the speed error, thereby acquiring the corrected position signal. After the position signal is corrected, the walking of the autonomous mower is recovered until the errors of the newly accumulated position signal cannot meet the accuracy requirement, then the autonomous mower is caused to stop walking again, and the above correction method is repeated. In the present embodiment, the autonomous mower stops walking for time T2 every time walking for time T1, and the actual motion parameter, including the actual speed with a value of zero, of the autonomous mower is used in the time T2, to correct the signal error of the inertial navigation device. The values of time T1 and time T2 are determined in conjunction with the factors such as the algorithm for the inertial navigation device to generate the position signal, and the correction algorithm. In other embodiments, T1 and T2 may also be variable values.

Generally, the longer the autonomous mower stops walking, that is, the longer the correction calculation of the position signal is, the more accurate the position signal acquired after the correction is. Such method of causing the autonomous mower to stop walking for a long time to solve the position is called as the zero speed correction method.

Figure 4:
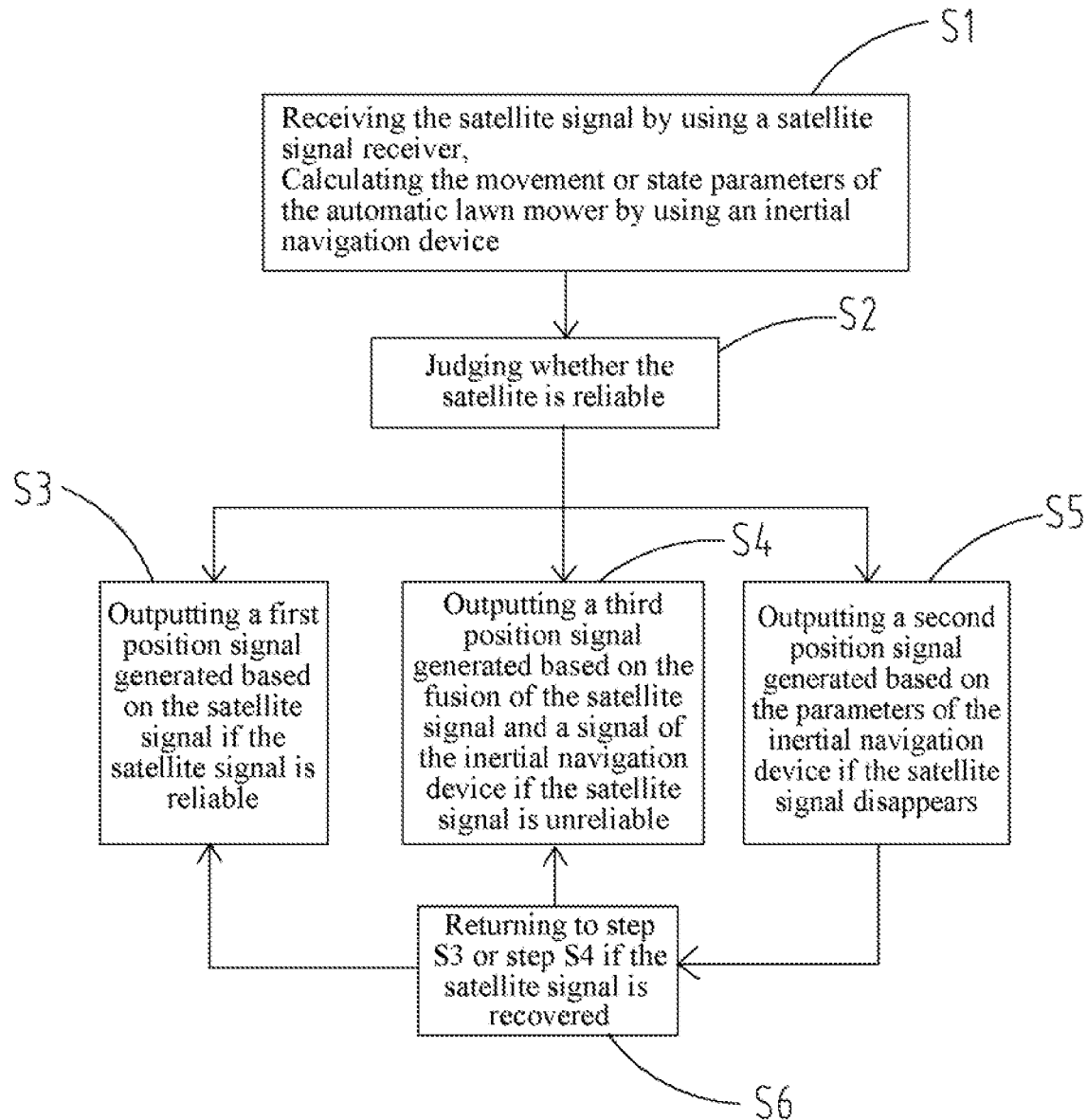
FIG. 4 is a step diagram of a method for determining the position of an autonomous mower according to an example embodiment of the present invention.

In an example embodiment, the method for determining the position of the autonomous mower further comprises the step S6: if the satellite signal is recovered, controlling the autonomous mower to continue to walk, and returning to step S3 or S4. If the autonomous mower is driven from the area where the satellite signal is completely blocked to the area where the receiving of the satellite signal is recovered, the operation in the step S5 is stopped, and the autonomous mower continues to walk based on the first position signal or the third position signal. If the autonomous mower receives the reliable satellite signal, the autonomous mower works based on the first position signal generated by the satellite signal, and if the satellite signal received by the autonomous mower is still unreliable, the autonomous mower works based on the third position signal generated based on the fusion of the satellite signal and the inertial navigation signal. The method for determining the position of the autonomous mower of the present embodiment may be represented by the step diagram as shown in FIG. 4.

In the work area of the autonomous mower, there is a work area D1' capable of receiving the reliable satellite signal, a work area D1" which can only receive the unreliable satellite signal, and a work area D2 which cannot receive the satellite signal. The autonomous mower receives the satellite signal, and the inertial navigation device is caused to be in the work state. When the autonomous mower is in different areas, the received satellite signals have different intensities, and the used navigation signals are different accordingly. When in the area D2, the autonomous mower cannot receive the satellite signal, the inertial navigation signal is corrected by the zero speed correction method, and the autonomous mower is in a state of stop-and-go. When the autonomous mower is driven out of the area D2, and recovers the receiving of the satellite signal, the continuous walking state is recovered. When the autonomous mower is driven from the area D2 to the area D1', the first position signal is used as the navigation signal. When the autonomous mower is driven from the area D2 to the area D1", the third position signal is used as the navigation signal. In the present embodiment, it is considered that the autonomous mower is driven from the area D1' where the satellite signal is reliable to the area D1" where the satellite signal is unreliable, and is then driven to the area D2 where the satellite signal disappears, which conforms to the characteristics of most of the work areas. Of course, the autonomous mower may also enter the area D2 directly from the area D1', and still works based on the navigation signal in the corresponding state, and the position signal of the inertial navigation device is reset by the satellite signal when the autonomous mower enters the area D2. Similarly, the autonomous mower can walk through the area of any state within the work area, and the determination of the navigation signal according to the state of the satellite signal is not affected.

In an example embodiment of the present invention, the autonomous mower comprises at least one sensor which is independent of the inertial navigation device and detects the motion parameter of the autonomous mower. Specifically, in the present embodiment, the autonomous mower comprises at least one wheel speed sensor which is independent of the inertial navigation device and detects the wheel rotary speed of the autonomous mower. The step further comprises the following operation: detecting the wheel rotary speed of the autonomous mower by using the wheel speed sensor to obtain the actual speed of the autonomous mower, and comparing the actual speed value with the speed value output by the inertial navigation device to obtain a speed error. When the signal error of the inertial navigation device exceeds the threshold, that is, when the position signal of the output of the inertial navigation device cannot meet the location precision requirement of the autonomous mower, the actual speed value is used to correct the speed error, and other various errors of the inertial navigation device are corrected based on the speed error, thereby acquiring the corrected position signal. Or, the signal error of the inertial navigation device is continuously corrected by using the actual speed value of the autonomous mower acquired based on the wheel speed sensor, and the reset period is determined based on the factors such as an algorithm for the inertial navigation device to generate the position signal by and the precision of the sensor of the inertial navigation device.

Figure 3:
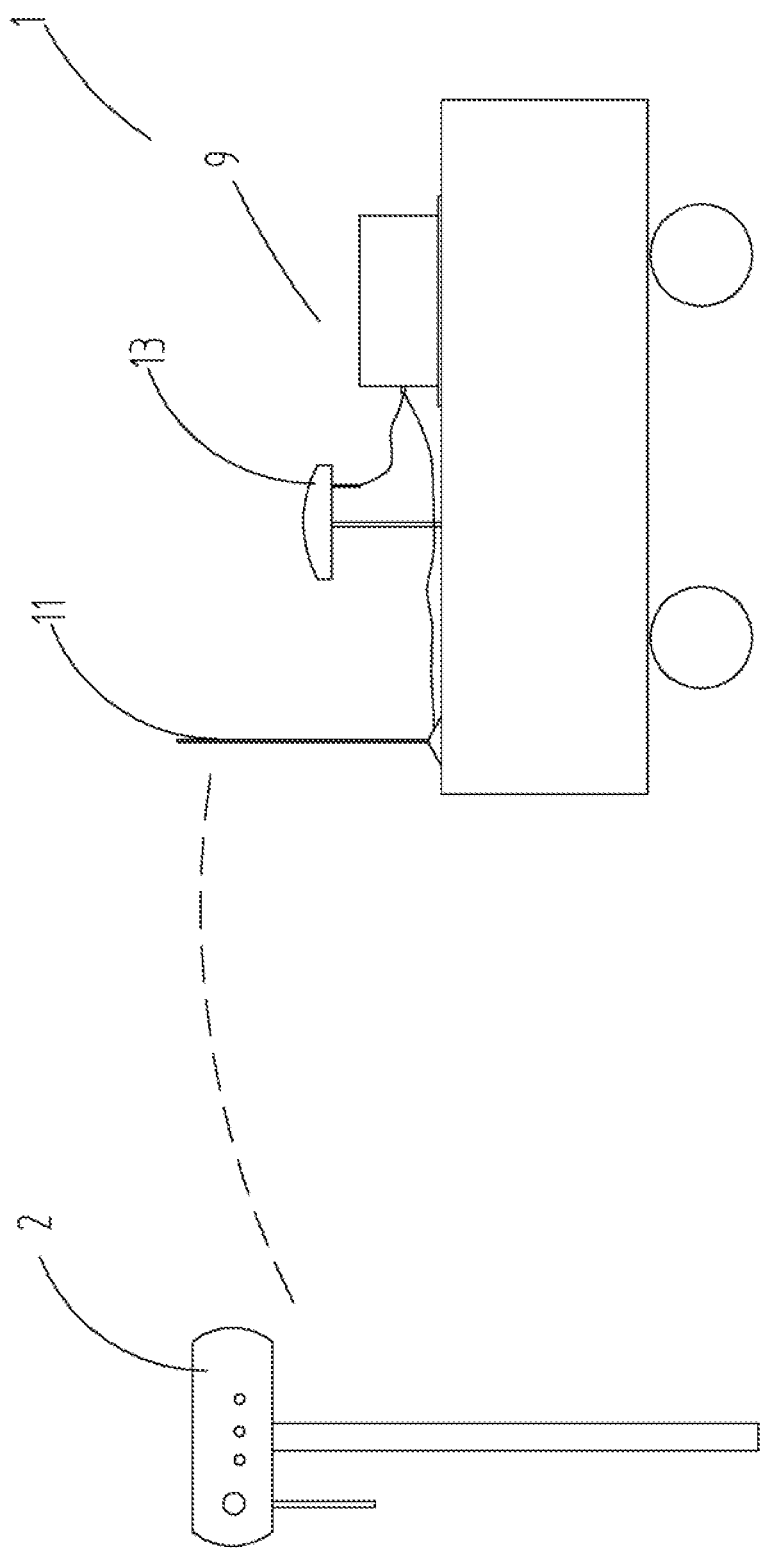
FIG. 3 is a composition schematic diagram of an automatic working system according to an example embodiment of the present invention.

The composition of the automatic working system according to an example embodiment of the present invention is as shown in FIG. 3. The automatic working system comprises an autonomous mower 1 and a base station 2. The autonomous mower 1 comprises a navigation module 9, and the navigation module 9 comprises a first signal receiving device 11, a second signal receiving device 13, an inertial navigation device and a fusion processing unit. The base station 2 is configured to receive and process a satellite signal, and send the processed signal to the first signal receiving device 11 by a wireless communication device; the second signal receiving device 13 receives the satellite signal; the fusion processing unit integrates the signal received by the first signal receiving device 11, the signal received by the second signal receiving device 13 and the signal of the inertial navigation device to generate a third position signal indicating the position of the autonomous mower 1.

As shown in FIG. 3, the autonomous mower 1 walks in the work area, the base station 2 is fixedly disposed in the work area or outside the work area, and the position of the base station 2 ensures that it can wirelessly communicate with the autonomous mower 1 in the work area. Usually, the distance between the base station 2 and the autonomous mower 1 does not exceed 100 km. The base station 2 comprises at least one satellite signal receiver receiving the satellite signal indicating the position of the base station 2, and the base station 2 comprises the wireless communication device for sending the processed satellite signal to the autonomous mower 1. The autonomous mower 1 is provided with a receiver, that is, the first signal receiver 11, for receiving the wireless signal transmitted by the base station 2. The autonomous mower 1 is further provided with a receiver, that is, the second signal receiving unit 13, for receiving the satellite signal. In the present embodiment, the satellite signal receiver is a GPS receiver. If only the GPS receiver on the autonomous mower is used for location, the error is larger, and in order to reduce the error of GPS location, the base station 2 is configured to correct the GPS location of the autonomous mower 1. Generally, the position coordinates of the base station 2 are known, and the GPS location coordinates received by the base station 2 are compared with the known position coordinates to obtain correction amounts of the GPS location coordinates. In the work process of the autonomous mower 1, the base station 2 continuously sends the correction amounts of the GPS location coordinates to the autonomous mower 1, on one hand, the second signal receiving device 13 of the autonomous mower 1 receives the satellite location signal indicating the autonomous mower 1, on the other hand, the first signal receiving device 11 of the autonomous mower 1 receives the correction amounts of the GPS location coordinates, and uses the correction amounts to correct the satellite location signal, thereby acquiring the GPS location signal with a higher precision. The position signal acquired by using the above method is called as a differential GPS signal. As shown in FIG. 3, in the present embodiment, the first signal receiving device 11 and the second signal receiving device 13 are both disposed at the top of the autonomous mower 1. In the present embodiment, the inertial navigation device is an integrated module comprising a plurality of sensors for detecting the motion parameters of the autonomous mower 1, including the speed, acceleration, direction, mileage, and the like of the autonomous mower 1. In the present embodiment, the fusion processing unit integrates the signals of the first signal receiving device 11, the second signal receiving device 13 and the inertial navigation device to generate a third position signal indicating the position of the autonomous mower 1. Specifically, the signal processing device processes the signals received by the first signal receiving device 11 and the second signal receiving device 13 to obtain a relatively precise satellite location signal, and the satellite location signal and the signal of the inertial navigation device are cross-checked, and finally the corrected and more precise position signal is output. The integrated position signal can also provide a precise location signal when the satellite signal is weak, and can maintain precise location for a long time.

An example embodiment of the present invention also provides a system for determining the position of an autonomous mower by using the above structure and method. The system comprises: a satellite navigation device, an inertial navigation device, and a fusion processing unit.

In an example embodiment of the present invention, when it is determined that the satellite signal receiver can receive the satellite signal, regardless of the intensity of the satellite signal, as long as the signals of one or more satellites are received, the position signal fused by the satellite signal and the inertial navigation signal, that is, the third position signal, is used as the position signal of the autonomous mower. In one case, when the satellite signal receiver cannot receive the satellite signal, the position signal fused by the satellite signal and the inertial navigation signal, that is, the third position signal, is still used as the position signal of the autonomous mower. In this case, the high-precision inertial navigation device is used and can consistently output the high-precision signal for a long time. In another case, when the satellite signal receiver cannot receive the satellite signal, the position signal output by the inertial navigation device is used as the position signal of the autonomous mower, and the zero speed correction algorithm is selectively used. Or the sensor which is independent of the inertial navigation device and detects the motion or state parameters of the autonomous mower is used to correct the error of the signal output by the inertial navigation device.

In an example embodiment of the present invention, regardless of whether the satellite signal receiver can receive the satellite signal or whether the received satellite signal is reliable or not, the position signal output by the inertial navigation device is used as the position signal of the autonomous mower. In one case, when the satellite signal is reliable, the satellite signal is used to correct the error of the signal output by the inertial navigation device, and when the satellite signal is unreliable or the satellite signal cannot be received, the zero speed correction algorithm is selectively used. Or the error of the signal output by the inertial navigation device is corrected by using the sensor which is independent of the inertial navigation device and detects the motion or state parameters of the autonomous mower. In another case, whether the satellite signal is reliable or not, the satellite signal is used to correct the error of the signal output by the inertial navigation device. In yet another case, whether the satellite signal is reliable or whether the satellite signal is received or not, the sensor which is independent of the inertial navigation device and detects the motion or state parameters of the autonomous mower is used to correct the error of the signal output by the inertial navigation device.

The present invention is not limited to the illustrated specific embodiment structures, and the structures or methods based on the concept of the present invention all fall within a protective scope of the present invention.

What is claimed is:

1. A self-moving mower, moving and working in a work area defined by a border, comprising:
   a housing having a bottom;
   a cutting module having a cutting component adjacent the bottom of the housing;
   a moving module, mounted in the housing, and driven by a drive motor to drive the self-moving mower to move;
   a control module, controlling the self-moving mower to move and work; a
   satellite navigation device, receiving a satellite signal;
   at least one position sensor, detecting a feature related to a position of the self-moving mower, wherein the at least one position sensor includes a motion or state sensor detecting a motion parameter or a state parameter of the self-moving motor, the motion or state sensor includes an inertial navigation sensor;
   wherein the self-moving mower further comprises a fusion processing unit, the fusion processing unit comprises at least two inputs, one of which is the satellite signal, and the other of which is an output of the position sensor;
   the fusion processing unit performs operation on the satellite signal and the output of the position sensor, and outputs position information of the self-moving mower; and
   the control module controls the moving module to drive the self-moving mower to move based on the position information of the self-moving mower output by the fusion processing unit;

wherein the control module judges an output error of the inertial navigation sensor by at least calculating a duration from the time when the inertial navigation sensor was corrected last time, and when the duration is larger than or equal to a preset value, the moving module is controlled to drive the self-moving mower to change a moving manner to correct the output error of the inertial navigation sensor; and wherein the control module controls the moving module to drive the self-moving mower to change the moving manner comprises controlling the self-moving mower to stop moving.

2. The self-moving mower according to claim 1, wherein the inertial navigation sensor comprises at least one of an accelerator, an odometer, a gyroscope and an attitude detection sensor.

3. The self-moving mower according to claim 1, wherein the control module judges the output error of the inertial navigation sensor, and when the output error is larger than or equal to a preset value, the satellite signal is used to correct the output error of the inertial navigation sensor.

4. The self-moving mower according to claim 1, wherein the self-moving mower comprises at least two of the position sensors, at least one of the two position sensors is independent from the inertial navigation sensor; and the control module judges the output error of the inertial navigation sensor, and when the output error is larger than or equal to a preset value, an output of the at least one position sensor independent from the inertial navigation sensor is used to correct the output error of the inertial navigation sensor.

5. The self-moving mower according to claim 1, wherein the moving module comprises a wheel set, and the motion or state sensor comprises a wheel speed meter, which detects a rotary speed of the wheel set.

6. The self-moving mower according to claim 1, wherein the position sensor comprises an environmental detection sensor, which detects a position relationship of the self-moving mower relative to the border.

7. The self-moving mower according to claim 6, wherein the environmental detection sensor comprises a surface recognition sensor, which detects an absence or presence of a surface to be processed relative to the position relationship of the self-moving mower.

8. The self-moving mower according to claim 7, wherein the surface sensor comprises at least one of a capacitance sensor, a camera and an infrared sensor.

9. The self-moving mower according to claim 6, wherein the environmental detection sensor comprises an obstacle detection sensor, which detects whether an obstacle exists in the moving direction of the self-moving mower.

10. The self-moving mower according to claim 9, wherein the obstacle detection sensor comprises at least one of an ultrasonic sensor and a laser sensor.

11. The self-moving mower according to claim 1, wherein the satellite navigation device is a DGPS device.

12. An automatic working system comprising the self-moving mower according to claim 1.

13. A control method for a self-moving mower, comprising the following steps:
receiving a satellite signal;
detecting a feature related to a position of the self-moving mower, and outputting a feature parameter, and an inertial navigation sensor is provided to detect the feature related to the position of the self-moving mower;
performing fusion processing on the satellite signal and the feature parameter, and outputting position information of the self-moving mower;
correcting an output error of the inertial navigation sensor using an output of at least one position sensor independent from the inertial navigation sensor when a duration from the time when the inertial navigation sensor was corrected last time is larger than or equal to a preset value;
controlling the self-moving mower to move based on the position information of the self-moving mower; and
executing mowing of grass using a cutting module.

* * * * *